UNITED STATES PATENT OFFICE 2,616,866

FIRE RETARDANT

Walter Juda, Cambridge, Mass., assignor to Pyrotron Development Corporation, New York, N. Y., a corporation of New York No Drawing. Application April 26, 1949, Serial No. 89,799

28 Claims. (Cl. 260—29.3)

This invention relates to fire-retardant and potentially heat insulating compositions, to methods of treating combustible and non-combustible materials therewith, and to the products of such treatments.

It is a matter of common observation and tacit agreement that many materials and articles in daily use are most advantageously made of combustible substances and/or furthermore in a condition which is not most satisfactory for their protection against fire. It is nonetheless desirable to render such materials or articles susceptible to withstand fire, in case they are subjected to it, and especially so, if it may be done without altering detrimentally their other qualities.

It is accordingly an object of the present invention to protect combustible and non-combustible materials from fire and to provide a fire retardant and potentially heat insulating composition which is effective for this purpose. Other objects will appear from the following disclosure.

It is now found that certain compositions, which are suitable to apply to combustible and non-combustible materials and articles of various kinds, may be prepared by directly reacting phenol with sulfonic acid, and by reacting the resulting reaction product therefrom directly with urea. This reaction may be followed, preferably, by a neutralization with ammonia or other volatile base.

Such compounds, being formed by direct chemical reaction of the components only, are substantially free from inorganic compounds in the reaction products obtained. This is believed to be highly significant in that it liberates both the reagents and reactive mass and also the resulting product from the usually deleterious physical properties of inorganic ionic compounds and from the uncontrollable effects of such inorganic compounds which may act as catalysts upon the polymerization and condensation reactions, per se. It also liberates the resulting products from the continued catalytic action and/or deleterious physical properties which such inorganic reactants would have if present. These urea phenol-sulfonates—and especially upon being neutralized—are stable under ordinary conditions and may be prepared, stored, mixed with dispersing liquids or fluid vehicles, in suitable condition for various applications, in various proportions, without being subject to further significant changes in their compositions or properties, before use or after. They may, therefore, be prepared, mixed, stored and used, in relatively stable condition, and form the basis for uniform, continuous adherent surface coatings, and present an altogether satisfactory finished appearance.

Such compositions, in which the molecular ratio of the sulfonic acid group or groups, linked to a molal quantity of the phenol, may vary from ½ to not over 3, and the molecular ratio of the urea which is combined with a molal quantity of the phenol in the resultant phenol sulfonate reaction product may vary from ⅓ to not over 3, are especially characterized by manifesting the property of fire-resistance when subjected to high, i. e. flame, temperatures. They also possess the additional property of undergoing, under such continued high temperature conditions, a finely dispersed intumescence. They thus form a minutely porous structure of high heat-insulating properties. In acquiring this porous, fine, vesicular structure, the pore spaces formed are presumably filled with non-combustible gases which are the by-products of the heat-induced decomposition. This presents a fire-retarding surface and also a potentially heat-insulating layer of considerable thickness over the combustible material or other article to which the composition was initially applied as a thin, though preferably continuous coating.

A preferred and representative group of such compounds are: monourea phenol monosulfonate, monourea phenol disulfonate, diurea phenol disulfonate, monourea phenol trisulfonate, diurea phenol trisulfonate and triurea phenol trisulfonate. In place of phenol or hydroxy benzene, $C_6H_5OH$, in the preparation of such compounds, cresols and other phenols may be used.

When the acid nature of these compounds is objectionable, and also in order to further enhance the fire-retardant effect, these compounds are preferably neutralized with ammonia or other volatile base in amount necessary to bring the pH of the composition to a value between 5 and 9, and preferably, for example, in substantially equimolar amounts of the base and sulfonic acid groups.

The preparation of the urea phenol sulfonates, in accordance with the present invention and for the purpose of serving as fire-retardant compounds, in general, may and preferably does consist in merely adding the urea, in solid form, to the phenolic sulfonic acid in question, which may have been previously prepared by direct reaction of the phenolic and acidic components in any conventional way, in the appropriate molecular proportions desired. The reaction is exothermic and the urea phenol sulfonates can be crystallized from aqueous solution. Neutralization with ammonia or other volatile base is preferably carried out after the complete formation of the urea phenol sulfonate.

I have still further discovered that the acid or neutral urea phenol sulfonate as thus prepared, may be improved in respect of its use for fire-retardant purposes, by further direct condensation wtih formaldehyde, paraformaldehyde, furfural, hexamethylene tetramine, and like aldehydes or aldehyde producing reagents, in molecular proportions of from 1 to 5, relative to the previously formed product as a whole or to the phenolic component thereof. In the appended claims the term aldehyde is therefore intended to include aldehydes, per se, and also reagent materials which serve as a source for the formation and liberation of aldehydes capable of polymerization with phenol and urea.

The acid or neutral urea phenol sulfonates polymerize much more slowly than an equivalent urea - formaldehyde or phenol - formaldehyde polymerization reaction, at substantially the same pH value and with substantially the same amounts of the reactants. In other words, by first combining phenol and urea through a sulfonic acid linkage the reaction with formaldehyde is substantially modified and correspondingly rendered subject to control, both in degree and in respect of the reaction products to be formed.

The resulting compounds, as a group, while stable at ordinary temperatures and conditions, manifest an increased reactivity, upon being subjected to heat or flame temperatures, which induces spontaneous intumescence. This effect is extremely advantageous, as will be readily appreciated, for fire-retarding and insulating purposes and effects.

A further qualification of such urea phenol-sulfonate formaldehyde resins, which enhances their properties in the above respects and also in rendering them more stable and compatible with dispersing agents or vehicles (for purposes of application to combustible surfaces in the first instance), may likewise be effected by neutralizing the residual acid radicals which they contain, with a volatile base such as ammonia, and to any preferred degree of resulting acidity or basicity as indicated by a pH value of from 5 to 9.

Such neutralization may be effected (either partially or completely) upon the phenol-sulfonic acid-urea compound before reaction of the latter with formaldehyde, or after its reaction with formaldehyde, or both. But it is to be observed and emphasized that the reaction sequence of the phenol with the sulfonic acid group, followed by reaction of the resulting reaction product with urea, and of the thus combined phenol-sulfonic acid-urea compound with formaldehyde must be followed and must also be conducted in the substantial absence of any extraneous, additional (non-volatile) inorganic catalyst or inorganic ions, in the reaction mixture. Such conditions of the reaction avoid the uncontrolled effects of catalysts and inorganic ions to promote uncontrolled continued polymerization or condensation reactions on standing in storage. This important stabilization of the polymer is due to the fact that these conditions, when carried out in this order, cause direct combination between the sulfonic group and the aromatic ring by electron bonding, and that the resulting phenol-sulfonic acid in turn is combined with the urea in the same organic salt molecule, namely, the urea phenol-sulfonate. Following these conditions of reaction, therefore, there are thus obtained stable resinous condensation products of controlled degrees of polymerization. Continued controlled polymerization of these stable products, to effect insolubility, infusibility and the like may then be obtained by conventional means, for example, by heating, adding polymerization catalysts and the like, if and when desired.

Further, in this association, the phenol component and also the urea component, linked by the sulfonic acid group, serve as independent sources of carbon, upon being subjected to high degrees of heat or to fire, and are effective gas formers and foaming agents thereby to instigate intumescence and the formation of a porous, heat insulating mass.

Moreover, in the preparation of stable compositions of various consistencies for applying in actual use as a fire-retardant, these compounds may be mixed with suitable liquids as dispersing agents, solvents, fluid vehicles, as in paint, etc., and also in association with other suitable insoluble or non-ionized solids, such as pigments, plasticizers, wetting agents, compatible solvents and the like, without thereby being subject to further polymerization or condensation, or physical or chemical change therein. To constitute effective fire-retardant, however, such mixed compositions must comprise substantial amounts of the active ingredient, that is of the urea phenol sulfonate or the condensation product derived therefrom; for practical purposes, this active ingredient should preferably exceed 25% by weight of the total solid and/or non-volatile content of the compositions. Upon application to the surfaces to be protected, in the usual ways, and evaporation of the volatile dispersing agent or solvent, or setting or drying of the vehicle, the compound is evenly distributed and finely dispersed throughout the resulting coating surface or layer formed therewith.

*Example 1*

Phenol sulfonic acid was prepared by melting 510 grams of phenol, bringing the temperature to 75° C. and adding slowly to the phenol a mixture of 516 grams of 95.5% sulfuric acid and 66 grams of water. The temperature of this reaction mixture—containing at the end of the reaction mostly ortho- and para-phenol sulfonic acid—was maintained at about 100° C. for 24 hours.

Six grams of urea was added to 21.5 grams of the above phenol sulfonic acid. The urea dissolved; then, within a few minutes, the mixture warmed to 50° C. and solidified. The resulting crystalline solid salt was a water-soluble urea phenol sulfonate having marked fire-retardant properties due to the formation of a substantially incombustible carbonaceous foam in the flame.

*Example 2*

Twenty grams of the phenol sulfonic acid described in Example 1 were mixed with 6 grams of urea. The urea dissolved in the mixture, the temperature rose to 45° C. and the mixture solidified, forming a solid urea phenol sulfonate. 25 cc. of formalin (containing about 37% formaldehyde) was added. The solid salt dissolved readily in the formaldehyde and, when the temperature had risen to 50° C., 13 cc. of aqueous ammonia (28% NH₃) was added, giving a slightly pink solution having a pH of 7.85. A sample of this solution was put aside in a stoppered test tube at room temperatures and showed no signs of thickening at the end of four months. A sample of cotton cloth was dipped in this solution, air dried and subjected to the flame of a Bunsen burner for 10 seconds. The treated fabric did not burn when removed from direct contact with the flame.

*Example 3*

Forty grams of the phenol sulfonic acid described in Example 1 was mixed with 18 grams of urea. After dissolution of the urea the temperature rose to about 40° C. and a mixture of a crystalline solid urea phenol sulfonate mixed with a saturated solution of this compound was formed. 50 cc. of aqueous formaldehyde was added. The temperature rose to 74° C. and a resinous gel formed at the end of about 10 minutes. 20 cc. of aqueous ammonia and 80 cc. of water was added to the gel which whitened upon standing. The supernatant solution was decanted, the gel was dried and cured in an oven at 90° C. for 12 hours. The resultant solid resin was then ground and sieved through a hundred mesh sieve.

Two parts by volume of finely divided sulfur and one part by volume of solid, fire-retardant resin (ground to finer than 100 mesh), were mixed by agitation. The blue flame of a Bunsen burner was applied to a sample of this mixture for 20 seconds and was then removed. The mixture did not continue to burn after the removal of the flame. Hence, the sulfur-resin mixture had been rendered effectively fire resistant and therefore safe for agriculture application, for example, from the air.

*Example 4*

768 grams of phenol were melted and heated to 90° C. 760 grams of sulfuric acid (95.5%) were then added. The mixture turned slightly pink, the temperature rose to 139° C. during the exothermic reaction in which the sulfonic acid was formed. The sulfonation may be followed by a base titration; almost one-half the initial acidity had disappeared during sulfonation at the end of 30 minutes. The sulfonic acid was cooled to 34° C., at which temperature it started to solidify. 423 grams of urea were then added, with stirring. The temperature rose to 55° C. in the exothermic formation of the urea phenol sulfonate. Upon cooling the urea phenol sulfonate solidified. A yield of about 1930 grams was obtained.

1800 cc. of formalin (containing about 37% formaldehyde) were added to 1874 grams of the above urea phenol sulfonate with stirring. The sulfonate dissolved gradually and the temperature rose to 86° C. while a progressive gradual thickening occurred. The temperature was maintained between 80 and 86° C. for ten minutes and the composition was then substantially neutralized to a pH between 6 and 8 with 660 cc. of aqueous ammonia (containing about 28% NH₃).

Upon cooling this mixture was extended with water, using about 75 parts by weight of the above mixture and 30 parts by weight of water. Two coats of this material were applied to cardboard and wooden panels, imparting marked fire-retardant properties thereto, as illustrated by the following comparative test.

A specimen (designated as specimen B) of double-faced corrugated paper (8" x 8") was treated on one side with the composition of this example by brushing the upper surface of the corrugated paper while held horizontally. The surface was allowed to dry for twenty-four hours at 25–30° C. A second application of the composition was then made in a similar manner on top of the first coating. The specimen was then allowed to dry for three days in an oven at 60° C. The dry coating of specimen B weighed then 35.2 grams; the thickness of the coating being of the order of 1/16".

A similar, but untreated, or control specimen A and specimen B were then subjected in succession to the following fire tests. Each specimen was supported horizontally (specimen B with its coated surface facing downward) 6½" above the top of a Bunsen burner which was adjusted to deliver a colorless flame 10½–11½" high with a tall indistinct inner cone. The time was recorded at which the upper center part of the test panels showed browning and the time at which the upper top center part started flaming.

The following table gives the results of this test:

|  | Specimen A | Specimen B |
|---|---|---|
| Time of browning at top center. | 15 seconds | 10 minutes, 40 seconds. |
| Time of flaming at top center. | 20 seconds | no flame at 15 minutes (test stopped). |

Specimen A was a complete loss at the end of four minutes. Specimen B, at the end of 15 minutes exposure, showed a voluminous layer of carbonaceous protective mat, on the underside, which was about two inches thick at the center and which had protected the test panel from damage except for slight browning of the center part (due to heat transfer).

When applied to non-combustible materials, for example steel, aluminum and other metals, the potential heat insulating properties of the thick carbonaceous layer which forms, as above described, when subjected to flame temperatures, is very valuable in retarding loss of structural strength and/or fusion in fires or other exposures to excessive heat.

The ammonia neutralized condensation products of Examples 2, 3 and 4 foam, when exposed to heat and/or flame temperatures, and produce a more voluminous carbonaceous protective mat of better fire-retardant and heat insulating properties than that obtainable under equivalent conditions from the urea phenol sulfonate of Example 1.

*Example 5*

94 grams of phenol and 302.5 grams of sulfuric acid (95.5%) were mixed and heated to a temperature between 100° C. and 110° C. for 18 hours. This mix was allowed to cool and after standing for two days a white, soft, solid mixture of mono-, di-, and trisulfonic acids separated from the liquid phase.

38.7 grams of the sulfonic acid mixture, while still liquid, were reacted with 12 grams of urea. The temperature rose to 80° C., corresponding to the formation of the di-urea sulfonate. The mixture was cooled to 27° C. and then 50 ml. of aqueous formaldehyde (37%) was added, temperature rose again to 65° C., the mixture was then neutralized by means of 45 ml. of aqueous ammonia (28%).

This composition was brushed onto cardboard and wooden panels and allowed to dry. Upon exposure to flame temperatures, the coating obtained from this material showed the very remarkable fire-retardant properties similar to the coating reported in Example 4.

In the appended claims the term "a phenol" or "phenols" is intended to include hydroxybenzene, cresols and like monohydric phenols.

I claim:

1. A method of imparting fire-retardant and potentially heat insulating properties to combustible and non-combustible materials comprising the step of applying thereto a composition containing a material selected from the group consisting of (1) a urea salt of a sulfonic acid of a monohydric phenol selected from the group consisting of hydroxy benzene and monoalkyl substituted derivatives thereof, and (2) the condensation polymer of an aldehyde with said salt, each neutralized with an inorganic volatile base.

2. A method as recited in claim 1 in which the material is a urea salt of a sulfonic acid of hydroxy benzene.

3. A method as recited in claim 1 in which the material is a urea salt of a sulfonic acid of cresol.

4. A method as recited in claim 1 in which the material is a condensation polymer of an aldehyde with a urea salt of a sulfonic acid of hydroxy benzene.

5. A method as recited in claim 1 in which the material is a condensation polymer of an aldehyde with a urea salt of a sulfonic acid of cresol.

6. A method as recited in claim 1 in which the material is applied in a fluid dispersion and is thereafter solidified by volatilization of the fluid medium.

7. A method as recited in claim 1 in which the material is the condensation polymer of an aldehyde with a urea salt of a sulfonic acid of a monohydric phenol selected from the group consisting of hydroxy benzene and monoalkyl substituted derivatives thereof and is applied in a fluid dispersion and thereafter solidified and insolubilized by polymerization.

8. A method of imparting heat insulating properties to combustible and non-combustible materials having applied thereto a composition containing a material selected from the group consisting of (1) a urea salt of a sulfonic acid of a monohydric phenol selected from the group consisting of hydroxy benzene and monoalkyl substituted derivatives thereof, and (2) the condensation polymer of an aldehyde with said salt, each neutralized with an inorganic volatile base, which comprises heating the said applied composition to effect intumescence thereof.

9. A fire-retardant and potentially heat insulating composition comprising, as the principal fire-retardant ingredient, substantial amounts of a material selected from the group consisting of (1) a urea salt of a sulfonic acid of a monohydric phenol selected from the group consisting of hydroxy benzene and monoalkyl substituted derivatives thereof, and (2) the condensation polymer of an aldehyde therewith, each neutralized with an inorganic volatile base.

10. A composition as recited in claim 9 in which the monohydric phenol is hydroxy benzene.

11. A composition as recited in claim 9 in which the monohydric phenol is cresol.

12. A composition as recited in claim 9 in which the polymer is the condensation product of hydroxy benzene and an aldehyde.

13. A composition as recited in claim 9 in which the condensation polymer is the condensation product of an aldehyde with cresol.

14. A composition as recited in claim 9 in which the aldehyde is formaldehyde.

15. A composition as recited in claim 9 in which the aldehyde is furfural.

16. A composition as recited in claim 9 in which the monohydric phenol is hydroxy benzene and the aldehyde is formaldehyde.

17. A composition as recited in claim 9 in which the monohydric phenol is hydroxy benzene and the aldehyde is furfural.

18. A composition as recited in claim 9 in which the monohydric phenol is cresol and the aldehyde is formaldehyde.

19. A composition as recited in claim 9 in which the inorganic volatile base is ammonia.

20. A composition as recited in claim 9 in which the phenol is hydroxy benzene, the aldehyde is formaldehyde and the inorganic base is ammonia.

21. A composition as recited in claim 9 in which the said material is present as a dispersion in an aqueous medium.

22. A composition as recited in claim 9 in which the said material is present as a dispersion in an aqueous medium, said dispersion having a pH within the range of about 5 to 9.

23. A substantially non-inflammable mixture of a finely divided sulfur and finely divided fire-retardant composition, the principal fire-retardant ingredient being a material selected from the group consisting of (1) a urea salt of a sulfonic acid of a monohydric phenol selected from the group consisting of hydroxy benzene and monoalkyl substituted derivatives thereof, and (2) the condensation polymer of an aldehyde therewith, each of said materials being neutralized with an inorganic volatile base.

24. An article having a fire-retardant and potentially heat insulating coating thereon, said coating comprising, as the principal fire-retardant ingredient, substantial amounts of a material selected from the group consisting of (1) a urea salt of a sulfonic acid of a monohydric phenol selected from the group consisting of hydroxy benzene and monoalkyl substituted derivatives thereof, and (2) the condensation polymer of an aldehyde therewith, each neutralized with an inorganic volatile base.

25. A method of preparing fire-retardant compositions, comprising the steps of reacting a monohydric phenol sulfonic acid, the monohydric phenol constituent thereof being selected from the group consisting of hydroxy benzene and monoalkyl substituted derivatives thereof, with urea and the resulting reaction product with formaldehyde, in the ratios of ½ to 3 molecular equivalents of the sulfonic acid component, ⅓ to 3 molecular equivalents of urea and 1 to 5 molecular equivalents of formaldehyde, and neutralizing the resulting product with an inorganic volatile base.

26. A method as recited in claim 25 in which the neutralization is conducted to a pH value of about 5 to 9.

27. A method of preparing fire-retardant compositions, comprising the steps of reacting a monohydric phenol sulfonic acid, said monohydric phenol being selected from the group consisting of hydroxy benzene and monoalkyl substituted derivatives thereof, with urea, wherein the sulfonic acid component is present in molecular proportions of from ½ to 3, and the urea component is present in molecular proportions of from ⅓ to 3, and neutralizing the resulting product with an inorganic volatile base.

28. A method as recited in claim 27 in which the neutralization is conducted to a pH value of about 5 to 9.

WALTER JUDA.

REFERENCES CITED

The following references are of record in the file of this patent:

UNITED STATES PATENTS

| Number | Name | Date |
|---|---|---|
| 1,841,840 | Muller | Jan. 19, 1932 |
| 2,127,068 | Muller | Aug. 16, 1938 |
| 2,191,818 | Steasny | Feb. 27, 1940 |
| 2,271,245 | Biedermann | Jan. 27, 1942 |